(12) United States Patent
Villa et al.

(10) Patent No.: US 8,008,738 B2
(45) Date of Patent: Aug. 30, 2011

(54) INTEGRATED DIFFERENTIAL PRESSURE SENSOR

(75) Inventors: Flavio Francesco Villa, Milan (IT); Pietro Corona, Milan (IT); Gabriele Barlocchi, Cornaredo (IT); Lorenzo Baldo, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 12/826,388

(22) Filed: Jun. 29, 2010

(65) Prior Publication Data

US 2010/0269595 A1   Oct. 28, 2010

Related U.S. Application Data

(62) Division of application No. 11/417,683, filed on May 4, 2006, now Pat. No. 7,763,487.

(30) Foreign Application Priority Data

May 6, 2005 (EP) ..................................... 05425306

(51) Int. Cl.
*H01L 29/84* (2006.01)
*G01L 9/00* (2006.01)

(52) U.S. Cl. . 257/415; 257/417; 257/419; 257/E29.324; 438/50; 438/53

(58) Field of Classification Search .............. 438/50, 438/53, 509
See application file for complete search history.

(56) References Cited

U.S. PATENT DOCUMENTS

| | | | | |
|---|---|---|---|---|
| 4,993,143 A | | 2/1991 | Sidner et al. | |
| 5,454,270 A | * | 10/1995 | Brown et al. | 73/720 |
| 5,683,594 A | * | 11/1997 | Hocker et al. | 438/53 |
| 5,969,591 A | * | 10/1999 | Fung | 338/42 |
| 6,085,596 A | * | 7/2000 | Jensen et al. | 73/754 |
| 6,376,291 B1 | * | 4/2002 | Barlocchi et al. | 438/175 |
| 2004/0142542 A1 | | 7/2004 | Murphy et al. | |
| 2004/0152228 A1 | * | 8/2004 | Benzel et al. | 438/50 |
| 2006/0144142 A1 | * | 7/2006 | Gogoi | 73/504.02 |

FOREIGN PATENT DOCUMENTS

| | | |
|---|---|---|
| EP | 0811831 A1 | 12/1997 |
| EP | 1324382 A1 | 7/2003 |
| EP | 1427010 A1 | 6/2004 |
| JP | 2002005763 | 1/2002 |

* cited by examiner

*Primary Examiner* — Ha Tran T Nguyen
*Assistant Examiner* — Shaka Scarlett
(74) *Attorney, Agent, or Firm* — Lisa K. Jorgenson; Seed IP Law Group PLLC; E. Russell Tarleton

(57) ABSTRACT

An integrated differential pressure sensor includes, in a monolithic body of semiconductor material, a first face and a second face, a cavity extending at a distance from the first face and delimited therewith by a flexible membrane formed in part by epitaxial material from the monolithic body and in part by annealed epitaxial material from the monolithic body, an access passage in fluid communication with the cavity, and in the flexible membrane at least one transduction element configured so as to convert a deformation of the flexible membrane into electrical signals. The cavity is formed in a position set at a distance from the second face and is delimited at the second face with a portion of the monolithic body.

16 Claims, 5 Drawing Sheets

INTEGRATED DIFFERENTIAL PRESSURE SENSOR

BACKGROUND

1. Technical Field

The present disclosure relates to an integrated differential pressure sensor.

2. Description of the Related Art

Figure 1:
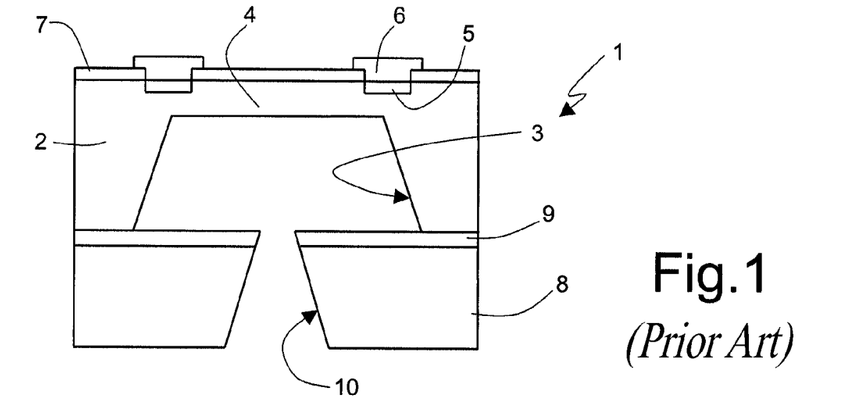
FIG. 1 is a cross-sectional view of a differential pressure sensor, of a known type.

Differential pressure sensors are made using known semiconductor technology. FIG. 1 illustrates by way of example a differential pressure sensor 1 of a piezoresistive type.

In detail, the differential pressure sensor 1 comprises a substrate 2 of semiconductor material (typically silicon), having a cavity 3 dug and accessible from the back of the substrate 2 and a flexible membrane 4 suspended above the cavity 3. Piezoresistive elements 5, connected in a Wheatstone-bridge configuration, are diffused in a surface portion of the flexible membrane 4 and are contacted by metallizations 6, and a passivation layer 7, made of thermal oxide, coats the top surface of the substrate 2. The back of the substrate 2 is bonded to a base layer 8, preferably made of Pyrex™ glass, or alternatively of silicon. The joining between the substrate 2 and the base layer 8 can be, for example, guaranteed by an intermediate layer 9, of a lead-based paste (glass frit). An access opening 10 traverses the base layer 8 and the intermediate layer 9, and reaches the cavity 3.

In use, the top side of the flexible membrane 4 (i.e., the side opposite to the cavity 3) is placed in communication with a first chamber (not shown) containing a fluid at a first pressure, and the cavity 3 is placed in fluid communication with a second chamber (not shown), containing a fluid at a second pressure, through the access opening 10. Consequently, the flexible membrane 4 is deformed as a function of the difference between the first pressure and the second pressure, and said deformation brings about an unbalancing of the Wheatstone bridge formed by the piezoresistive elements 5. Said unbalancing may be detected by appropriate sensing electronics, which derives therefrom the desired differential pressure measurement.

Figure 2:
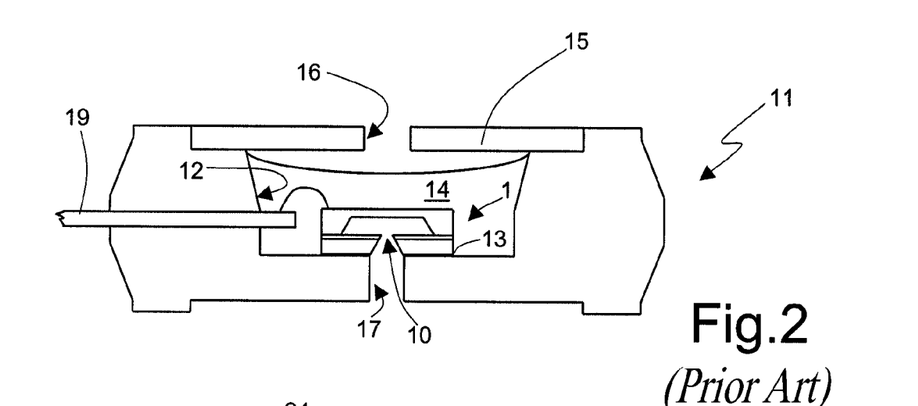
FIG. 2 is a cross-sectional view of a package of a known type housing the differential pressure sensor illustrated in FIG. 1.

FIG. 2 shows a package 11 of a known type housing the differential pressure sensor 1. In detail, the package 11 is made of thermoplastic material, and has a chamber 12, to a bottom internal surface of which the base layer 8 of the differential pressure sensor 1 is bonded via a layer of adhesive material 13. The chamber 12 is filled with a silicone coating gel 14, and is closed at the top by a metal cover 15, which further delimits a main top surface of the package 11. The silicone coating gel 14 surrounds and coats the differential pressure sensor 1, and acts as a protection against the external environment. The metal cover 15 has a first opening 16, which is placed, in use, in fluid communication with the first chamber. Furthermore, the base of the package 11, in a position corresponding to the access opening 10, has a second opening 17 connected to the access opening 10 and placed, in use, in fluid communication with the second chamber. The electrical connection between the differential pressure sensor 1 and the outside of the package 11 is provided via metal leads 19, which come out of the package 11.

Figure 3:
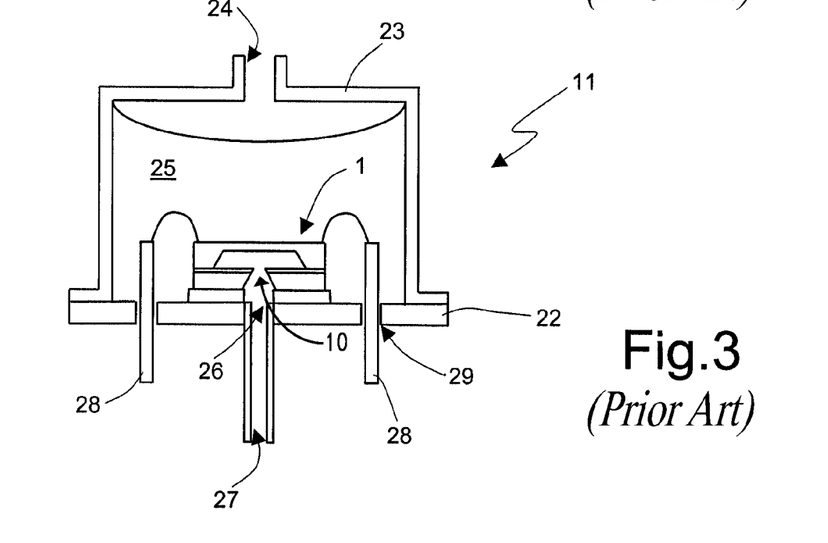
FIG. 3 is a cross-sectional view of a different package of a known type housing the differential pressure sensor illustrated in FIG. 1.

Alternatively (FIG. 3), packages 11 are known comprising a ceramic base 22, bonded to which is the differential pressure sensor 1, and a metal casing 23, which encloses the differential pressure sensor 1 and rests on the ceramic base 22 in contact therewith. The metal casing 23 is open at the top to form a first port 24, which is placed, in use, in fluid communication with the first chamber. Furthermore, the inside of the metal casing 23 is filled with a silicone coating gel 25, which surrounds and coats the differential pressure sensor 1. Through the ceramic base 22, in a position corresponding to the access opening 10, a passage 26 is provided, through which a second port 27 is placed in communication with the access opening 10. Furthermore, in use, the second port 27 is placed in fluid communication with the second chamber. Electrical connection between the differential pressure sensor and the outside of the package 11 is provided via metal leads 28, which come out of the ceramic base 22 through further passages 29 provided in the ceramic base 22.

The pressure sensor described, though enabling a differential pressure measurement to be carried out, has, however, rather large dimensions, principally due to the need to perform a digging from the back of the substrate 2. The manufacturing process, for similar reasons, is rather complex and costly, principally due to the need to perform the digging from the back (generally via a TMAH etching) and the bonding between the substrate 2 and the base layer 8. Clearly, said disadvantages are particularly evident in applications wherein features such as economy and simplicity of production are constraining design characteristics.

BRIEF SUMMARY

A differential pressure sensor is provided that will enable the disadvantages and problems referred to above to be overcome, and in particular that will be simple to manufacture at a low cost.

In one embodiment of the present disclosure, an integrated differential pressure sensor includes a monolithic body of semiconductor material having a first face and a second face, and a cavity buried within the monolithic body and extending in the monolithic body a distance from the first face and delimiting in conjunction with the first face a flexible membrane. Furthermore, the buried cavity extends a distance from the second face and delimits, in conjunction with the second face, a portion of the monolithic body. The sensor includes an access passage in fluid communication with the cavity, where the access passage includes an access trench extending through the monolithic body, and at least one transduction element formed in the flexible membrane and configured so as to convert a deformation of the flexible membrane into electrical signals.

In another embodiment of the disclosure, a pressure sensor system includes an integrated differential pressure sensor and a package configured to house the pressure sensor. The integrated differential pressure sensor includes a monolithic body of semiconductor material having a first face and a second face, and a cavity buried within the monolithic body and extending a distance from the first face and delimiting, in conjunction with the first face, a flexible membrane. Furthermore, the cavity extends a distance from the second face and delimits, in conjunction with the second face, a portion of the monolithic body. Additionally, the sensor includes an access passage in fluid communication with the cavity. The access passage has a buried connection channel in fluid communication with the cavity and an access trench extending through the monolithic body. In one embodiment, the access trench extends between the first face and the buried connection channel. The sensor includes at least one transduction element formed in the flexible membrane and configured to convert a deformation of the flexible membrane into electrical signals.

The package includes a first portion and a second portion mechanically coupled and defining an internal space facing the flexible membrane. The internal space is fluidly connected to a first opening of the package and insulated in a fluid-tight way from the access trench via a fluid-tight means.

BRIEF DESCRIPTION OF THE SEVERAL VIEWS OF THE DRAWINGS

For a better understanding of the present disclosure, preferred embodiments thereof are described, purely by way of non-limiting example and with reference to the attached drawings, wherein.

DETAILED DESCRIPTION

Embodiments of a process for manufacturing an integrated differential pressure sensor are now described. Such a manufacturing process is based upon the processes described in the patent application No. EP-A-1 324 382 and in the European patent application No. 04 425 197.3, filed in the name of the present applicant on Mar. 19, 2004.

Figure 4:
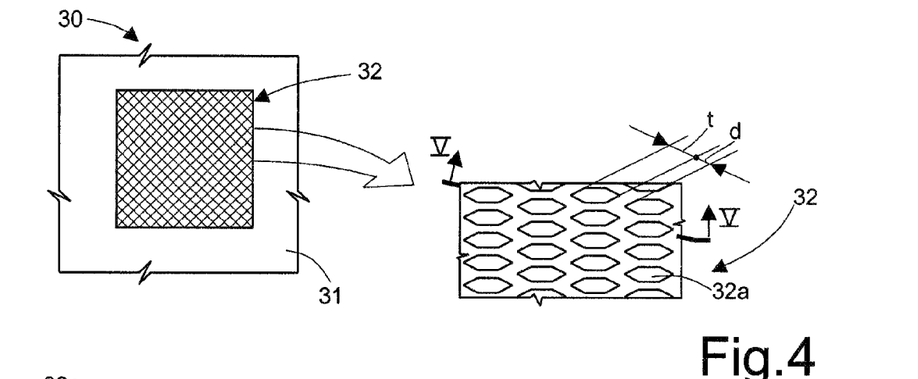
FIG. 4 shows a top plan view of a wafer of semiconductor material in an initial step of a process for manufacturing a differential pressure sensor.
Figure 9:
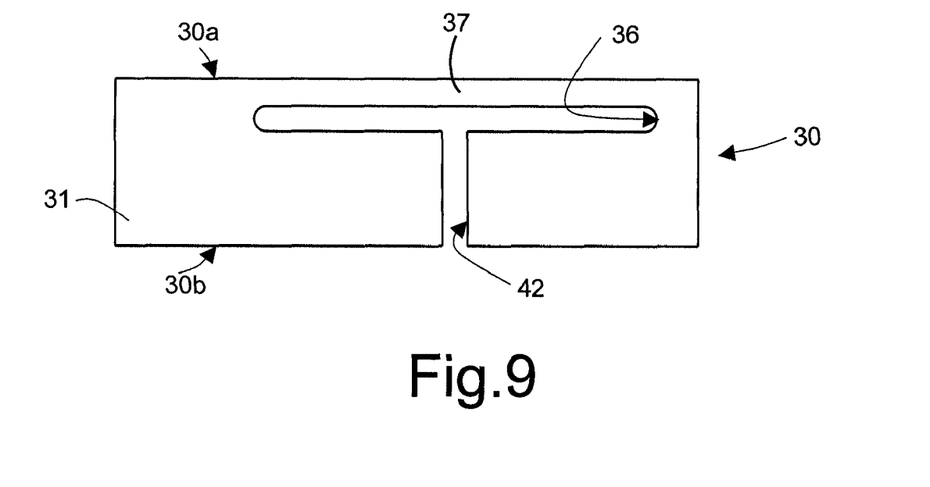

FIG. 4 (which is not in scale, as neither are the following figures) shows a wafer 30 made of semiconductor material, for example monocrystalline silicon, comprising a substrate 31, for example of an N type, designed to form the bulk of the differential pressure sensor, and having a front 30a and a back 30b (see also FIG. 9).

Figure 5:
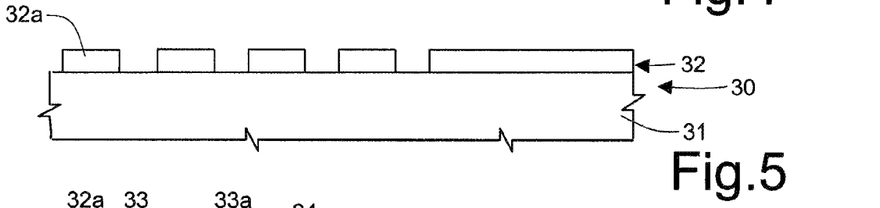
FIG. 5 is a cross-sectional view at an enlarged scale of details of FIG. 4.

In an initial step of the manufacturing process, a resist mask 32 is formed on the wafer 30 (see also to the cross section of FIG. 5). In detail, the resist mask 32 has an approximately square area comprising a plurality of mask portions 32a having an approximately hexagonal shape, and defining a honeycomb lattice (as shown in the enlarged detail of FIG. 4). In one embodiment, for example, the distance t between opposite sides of the mask portions 32a is 2 µm, whilst the distance d between facing sides of adjacent mask portions 32a is 1 µm.

Figure 6:
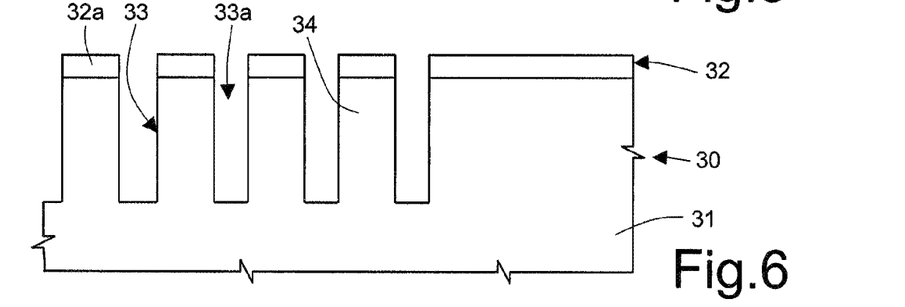
FIGS. 6-9 show cross sections in subsequent steps of the manufacturing process, according to a first embodiment of the present disclosure.

Using the resist mask 32 (FIG. 6), an anisotropic etching of the substrate 31 is performed, following upon which trenches 33 are formed, which delimit pillars 34 of silicon having a cross section corresponding to the mask portions 32a. The trenches 33, having for example a 10 µm depth, communicate with one another and together form a labyrinthine region 33a of a complex shape, with a cross section corresponding to the honeycomb lattice of the resist mask 32.

Figure 7:
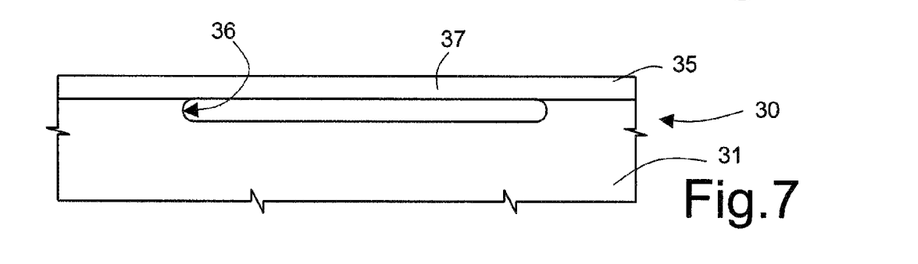

Next (FIG. 7), the resist mask 32 is removed and an epitaxial growth is performed in a deoxidizing environment (typically, in an atmosphere with high hydrogen concentration, preferably with trichlorosilane-SiHCl$_3$). Consequently, an epitaxial layer 35 (indicated only in FIG. 7 and not distinguished from the substrate 31 in what follows), for example of an N type and of a thickness of 9 µm, grows on top of the pillars 34 and closes the labyrinthine region 33a at the top, entrapping the gas therein. A thermal annealing, for example for thirty minutes at 1190° C., is then performed preferably in a hydrogen atmosphere, or, alternatively, a nitrogen atmosphere. As discussed in the patent applications referred to above, the annealing step causes a migration of the silicon atoms, which tend to move into the position of lower energy. Consequently, and also thanks to the small distance between the pillars 34, the silicon atoms migrate completely from the portions of the pillars 34 within the labyrinthine region 33a, and a buried cavity 36 is formed, closed within the substrate 31. For example, the buried cavity 36 has a side of 500 µm. On top of the buried cavity 36 there remains a thin silicon layer, made up in part by epitaxially grown silicon atoms and in part by migrated silicon atoms, which forms a membrane 37, which is flexible, is suspended above the buried cavity 36, and can be deflected in the presence of external stresses.

Figure 8:
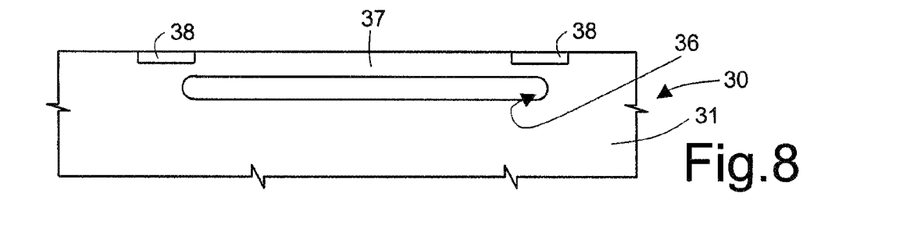

Next (FIG. 8), piezoresistive elements 38 are formed in a surface portion of the membrane 37 opposite to the buried cavity 36 (the piezoresistive elements 38 are illustrated only in FIG. 8 and no longer appear in the subsequent figures). In detail, the piezoresistive elements 38 are formed by means of P type diffusion or implantation, for example of boron atoms, and are connected to one another in a Wheatstone-bridge configuration. Alternatively to what is illustrated, the piezoresistive elements 38 can be made of polysilicon on top of the membrane 37.

According to a first embodiment of the present disclosure (see FIG. 9), a front/back alignment of the wafer 30 is then performed, followed by a digging from the back 30b via an anisotropic etching so as to provide an access trench 42, which traverses a large part of the substrate 31 until it reaches the buried cavity 36. The etching is performed during a fixed time interval, in such a way as not to reach the internal surface of the membrane 37 (in contact with the buried cavity 36). Next, the wafer 30 is cut so as to form dice, each of which comprises a differential pressure sensor.

In use, the external surface of the membrane 37 (i.e., the one opposite to the buried cavity 36) is placed in communication with a first chamber (not illustrated) containing a fluid at a first pressure, whilst the internal surface of the membrane 37 is placed in fluid communication with a second chamber (not illustrated) containing a fluid at a second pressure, through the access trench 42. In this way, the external surface of the membrane 37 is subjected to the pressure of the fluid contained in the first chamber, whilst the internal surface of the membrane 37 is subjected to the pressure of the fluid contained in the second chamber, and the membrane 37 undergoes a deformation that is a function of the difference between the first pressure and the second pressure. Said deformation causes unbalancing of the Wheatstone bridge formed by the piezoresistive elements 38, which, in a per se known and not illustrated manner, is detected by an appropriate electronic sensing circuit, generally comprising an instrumentation amplifier. From the detected unbalancing, the electronic sensing circuit derives the desired differential pressure measurement.

Figure 10:
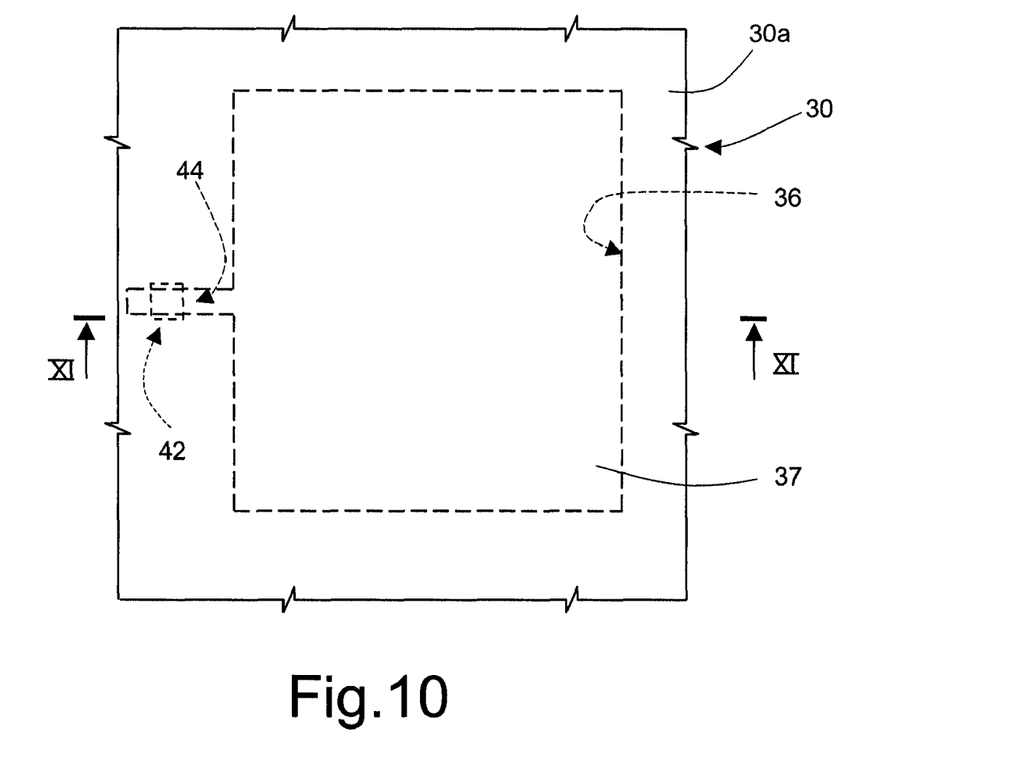
FIG. 10 is a top plan view of a wafer of semiconductor material in a final step of a process for manufacturing a differential pressure sensor, according to a second embodiment of the present disclosure.
Figure 11:
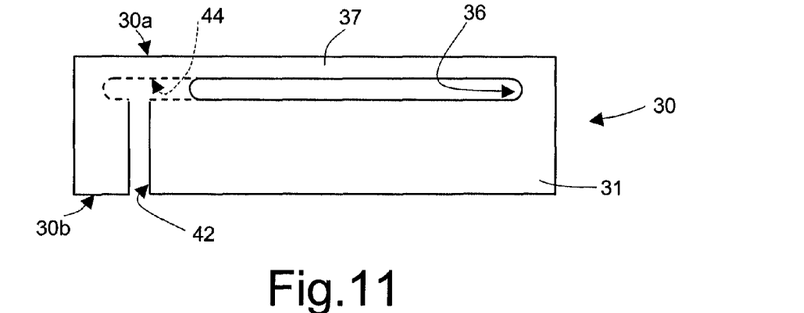
FIG. 11 is a cross-sectional view of the pressure sensor illustrated in FIG. 10, taken along the line XI-XI.

In order not to damage the membrane 37 during formation of the access trench 42, thus changing the mechanical characteristics thereof, a second embodiment is proposed, which is illustrated in FIGS. 10 and 11. In detail, simultaneously with the formation of the buried cavity 36, a connection channel 44 is formed, buried within the substrate 31, in a lateral position with respect to the buried cavity 36 and in fluid communication therewith. For said purpose, process steps are performed that are substantially similar to the ones previously described (and for this reason are not described again), but starting from a resist mask 32 that laterally has a rectangular projection of a shape corresponding to the desired shape of the connection channel 44. During the final steps of the manufacturing process, the access trench 42 is not provided in a position corresponding to the buried cavity 36, but in a position corresponding to the connection channel 44 in such a way that a possible overetching will involve a portion of the wafer 30 overlying the connection channel 44, instead of the membrane 37.

A third embodiment, illustrated in FIG. 12, again envisages the formation of the connection channel 44 in a lateral position with respect to the buried cavity 36, and in fluid communication therewith. However, unlike the second embodiment described, a digging from the front 30a of the wafer 30 is performed to provide the access trench 42, which reaches the connection channel 44. In this way, advantageously the digging step is considerably simplified, in so far as it is necessary to traverse a much smaller thickness of silicon (around 10 μm) as compared to the etching from the back 30b of the wafer 30. Consequently, in this case, the access trench 42 is accessible from the front 30a, instead of from the back 30b of the wafer 30.

Figure 12:
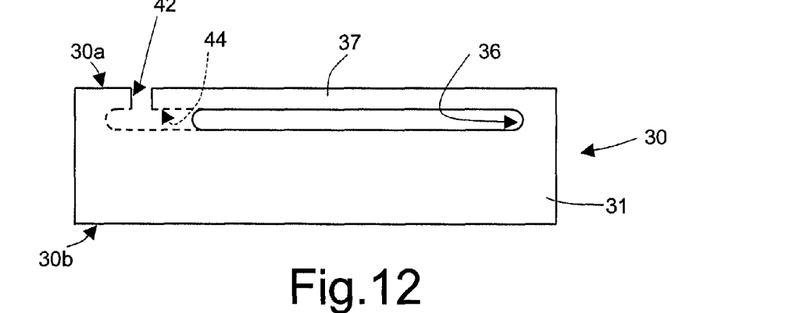
FIG. 12 is a cross-sectional view of a differential pressure sensor according to a third embodiment of the present disclosure.

The first two embodiments do not impose any particular constraints on the package of the differential pressure sensor, which can be of a traditional type. On the contrary, the third embodiment imposes, to enable the differential pressure measurement, fluid-tight insulation between the area overlying the membrane 37 and the access trench 42 provided on the front 30a.

According to an embodiment of the present disclosure, a package 50 suited for the purpose (FIGS. 13 and 14) is consequently proposed. In detail, the package 50 is of a premolded plastic type, and comprises a base member 51 and a cover 52. The base member 51 is open at the top and houses the differential pressure sensor inside it. In particular, the die of the differential pressure sensor is bonded to an internal bottom surface of the base member 51, via a layer of adhesive material 53. The base member 51 has, at the top, in an area corresponding to its open portion, a first threaded portion 54, and the cover 52 has a second threaded portion 55 complementary to the first threaded portion 54, designed to be screwed to the first threaded portion 54 so as to close the package 50. The cover 52 has, on the top, a first opening 58, which is connected to a first open duct 59, placed in communication with the membrane 37. The base member 51 has laterally a second opening 60, which is connected to a second open duct 61, placed in fluid communication with the access trench 42. In addition, an internal surface of the cover 52, facing the membrane 37, is provided with slots 56, which house a seal ring 57, made of silicone resin. When the cover 52 is screwed to the base member 51, the seal ring 57 bears upon the substrate 31, outside the membrane 37 so as to insulate in a fluid-tight manner the access trench 42 from the first opening 58. In particular, the seal ring 57 does not rest on the membrane 37 so as not to exert a pressure on the membrane 37 and hence so as not to alter mechanical characteristics thereof. Conveniently, an internal area 62 of the package 50 overlying the membrane 37 is filled with a protection gel, for example a silicone gel, to protect the membrane 37 from the external environment.

Figure 13:
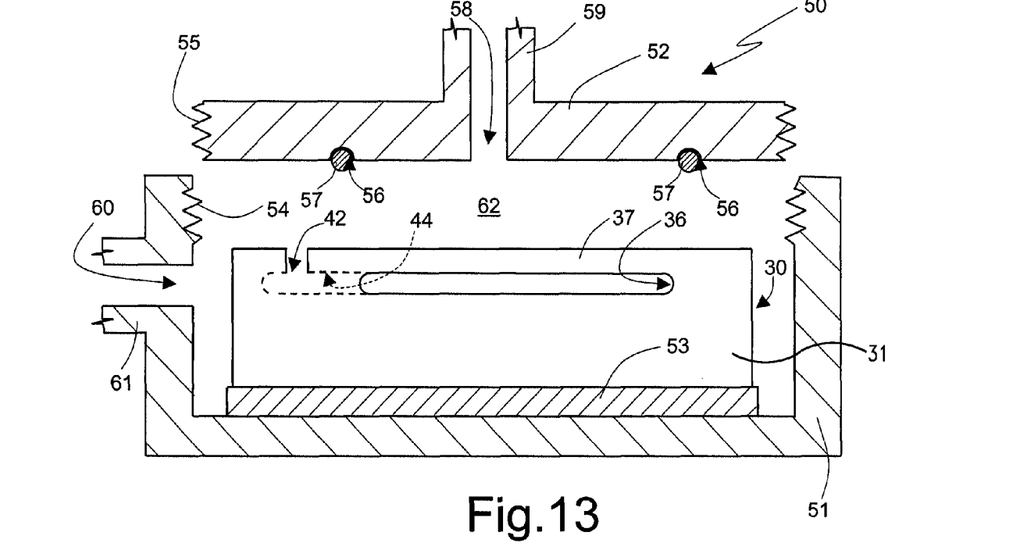
FIG. 13 is a cross-sectional view of a package housing the pressure sensor illustrated in FIG. 12.
Figure 14:
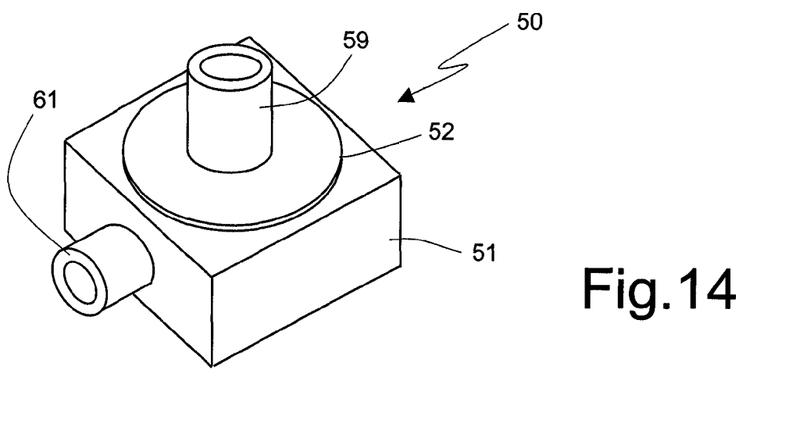
FIG. 14 is a schematic perspective view of the package of FIG. 13.

In use, the first and second open ducts 59, 61 are fluidally connected to the first and second chamber, respectively, in such a way that the membrane 37 is subjected to the difference of pressure of the fluids contained in the two chambers and is deformed accordingly. The seal ring 57 operates in such a way that the fluid contained in the second chamber will not come into contact with the top surface of the membrane 37.

The assembly process of the package 50 envisages initially bonding of the substrate 31 to the internal bottom surface of the base member 51; then screwing of the cover 52 to the base member 51 so as to close the package 50 and to provide simultaneously fluid-tight insulation between the internal area 62 of the package 50 overlying the membrane 37 and the access trench 42, via the seal ring 57; and finally, conveniently, introducing the protection gel through the first duct 59 so as to occupy the internal area 62.

The various embodiments of the differential pressure sensor disclosed herein have reduced dimensions, in so far as they are integrated in a single monolithic body of semiconductor material and do not require the use of wafers of different materials and their consequent bonding. The manufacturing process is simple and inexpensive, and compatible with the integration of a corresponding electronic read circuit.

Furthermore, the sensitive part of the sensor (in particular, the membrane 37 and the piezoresistive elements 38) is automatically protected mechanically from the back 30b of the wafer by the fact that the buried cavity 36 is formed within the substrate 31. In addition, given that the buried cavity 36 has a thickness of a few microns, the possibility of deflection of the membrane is limited in order to prevent any breakdown of the pressure sensor.

The mass of the membrane 37 is smaller than that of solutions of a known type, which means shorter response times of the differential pressure sensor.

Furthermore, the third embodiment described enables a further simplification of the manufacturing process, in so far as it eliminates the need for a front/back alignment of the wafer, given the absence of a digging from the back 30b of the wafer. Furthermore, the time for manufacturing is reduced, in so far as the etching from the front 30a is faster.

The differential pressure sensor described can advantageously be used in a plurality of applications, for example to measure the level of the water in washing machines and dish-washers, or else, in the automotive field, for monitoring pressure in airbags or inflation pressure of the tires, for monitoring the oil pressure or the fuel injection pressure, or for controlling the breakdown pressure of the ABS system.

Finally, it is clear that modifications and variations can be made to what has been described and illustrated herein, without thereby departing from the scope of the present disclosure, as defined in the appended claims.

Figure 15:
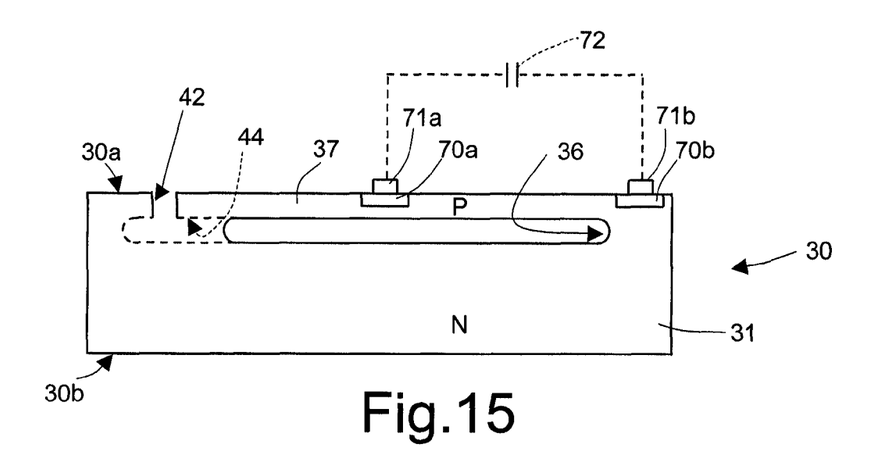
FIG. 15 is a cross-sectional view of a capacitive differential pressure sensor according to a fourth embodiment of the present disclosure.

In particular, the described manufacturing process can be applied, with minor modifications, to the manufacturing of a differential pressure sensor of a capacitive type (FIG. 15). In this case, the membrane 37 is doped, for example in a final step of the manufacturing process, via an implantation of dopant species of a P type conductivity, opposite to that of the substrate 31 (for example, using boron atoms). Then, implantations of a P$^+$ type and of an N$^+$ type and corresponding diffusion steps are performed to provide, respectively, first and second contact regions 70a, 70b, in positions corresponding to the membrane 37 and to the bulk of the substrate 31. Next, metal contacts 71a, 71b are formed on top of the first and second contact regions 70a and 70b, respectively. In this way, the membrane 37 and the bulk of the substrate 31 form the electrodes of a capacitor 72 (represented schematically in FIG. 15), the dielectric of which is constituted by the gas contained in the buried cavity 36, and the capacitance of which varies following upon the deformations of the membrane 37. Clearly, the manufacturing process does not envisage in this case the formation of the piezoresistive elements 38, whilst the etching steps leading to the formation of the access trench 42 and of the connection channel 44 are substantially the same.

Figure 16:
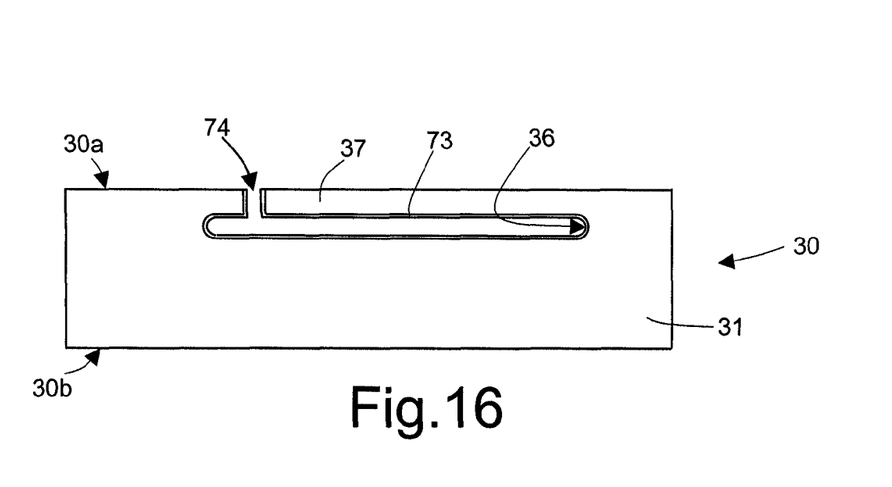
FIG. 16 is a cross-sectional view of a wafer of semiconductor material in an optional step of the manufacturing process according to an embodiment of the present disclosure.

Furthermore (see FIG. 16), the first embodiment described may envisage the formation of a stop oxide layer 73 on the internal walls of the buried cavity 36, prior to etching from the back 30b, which leads to the formation of the access trench 42. In particular, for said purpose a digging from the front 30a is first performed via an anisotropic etching, to provide an oxidation trench 74 which reaches the buried cavity 36. Then, a thermal oxidation is performed by supplying oxygen through the oxidation trench 74 so as to form the stop oxide layer 73. Said embodiment is advantageous in so far as it eliminates the risk of overetching the membrane 37 during digging of the access trench 42; in fact, in this case, the etching can be performed with end-stop on the stop oxide layer 73.

Furthermore, the geometrical shape of the membrane can be different, for example can be circular or generically polygonal. The structure of the resist mask 32 and the shape of the pillars 34 may vary with respect to what is illustrated. The pillars 34 can be replaced by walls of semiconductor material of a reduced thickness, or in general by other thin structures such as to enable migration of the silicon during the annealing step leading to the formation of the buried cavity 36. For example, the walls can be rectilinear, parallel to one another, and separated by deep trenches.

Finally, in a final step of the manufacturing process, it is possible to integrate the electronic read circuit of the differential pressure sensor within the wafer 30, i.e., together with the differential pressure sensor.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An integrated differential pressure sensor, comprising:
a monolithic body of semiconductor material having a first face and a second face;
a cavity buried within the monolithic body and extending in the monolithic body a distance from the first face and delimited at the first face by a flexible membrane integral with the monolithic body and including epitaxial material from the monolithic body and annealed epitaxial silicon from the monolithic body, the cavity delimited at the second face by a portion of the monolithic body;
an access passage in fluid communication with the cavity, the access passage having an access trench extending through the monolithic body and not the flexible membrane; and
at least one transduction element formed on the flexible membrane and configured so as to convert a deformation of the flexible membrane into electrical signals.

2. The sensor of claim 1, wherein the access trench extends between the second face and the cavity.

3. The sensor of claim 1, wherein the access passage further comprises a buried connection channel, formed within the monolithic body, laterally with respect to, and in fluid communication with, the cavity.

4. The sensor of claim 3, wherein the access trench extends between the second face and the connection channel.

5. The sensor of claim 3, wherein the access trench extends between the first face and the connection channel.

6. The sensor of claim 1, wherein the at least one transduction element is one of either a piezoresistive element or a capacitive element.

7. A pressure sensor system comprising:
an integrated differential pressure sensor, the integrated differential pressure sensor including
a monolithic body of semiconductor material having a first face and a second face,
a cavity buried within the monolithic body and extending into the monolithic body a distance from the first face and delimited at the first face by a flexible membrane integrally formed with the monolithic body having a first part substantially identical in crystalline structure to epitaxial material from the monolithic body and having a second part substantially identical in crystalline structure to annealed epitaxial material from the monolithic body, the cavity delimited at the second face by a portion of the monolithic body,
an access passage in fluid communication with the cavity, the access passage having
a buried connection channel formed within the monolithic body laterally with respect to, and in fluid communication with, the cavity, and
an access trench extending through the monolithic body between the first face and the connection channel and not through the flexible membrane, and
at least one transduction element formed in the flexible membrane and configured so as to convert a deformation of the flexible membrane into electrical signals; and
a package that houses the monolithic body, the package including a first portion and a second portion mechanically coupled and defining an internal space facing the flexible membrane, the internal space in fluid communication with a first opening in the package and insulated from fluid communication with the access trench via a fluid-tight seal.

8. The pressure sensor system of claim 7, wherein the fluid-tight seal comprises a seal ring made of elastomeric material arranged between the package and the monolithic body.

9. The pressure sensor system of claim 7, wherein the package comprises a second opening in fluid communication with the access trench.

10. The pressure sensor system of claim 7, wherein the at least one transduction element comprises one of either a piezoresistive element or a capacitive element.

11. A device, comprising:
an integrated differential pressure sensor that comprises:
a monolithic body of semiconductor material having a first face and a second face;
a cavity buried within the monolithic body and delimited at the first face by a flexible membrane having epitaxial silicon atoms from the body and annealed epitaxial silicon from the monolithic body, the cavity delimited at the second face by a portion of the monolithic body, the cavity further delimited by oxidized internal walls;

an access passage formed through the monolithic body and not the flexible membrane and in fluid communication with the cavity; and at least one transduction element formed in a surface portion of the flexible membrane and configured to convert a deformation of the flexible membrane into electrical signals.

12. The sensor according to claim 11, wherein the access passage comprises an access trench extending between the second face and the cavity.

13. The sensor according to claim 11, wherein the access passage comprises an access trench extending between the first face and the cavity.

14. The sensor according to claim 11, wherein the access passage comprises a buried connection channel formed within the monolithic body, the buried connection channel being in fluid communication with the cavity.

15. The sensor according to claim 14, wherein the access passage further comprises an access trench extending between the second face and the buried connection channel.

16. The sensor according to claim 14, wherein the access passage further comprises an access trench extending between the first face and the buried connection channel.

* * * * *